United States Patent Office 3,096,293
Patented July 2, 1963

3,096,293
METHOD OF INCREASING THE VISCOSITY OF AN AQUEOUS SOLUTION OF A DEACETYLATED POLYSACCHARIDE
Allene R. Jeanes, Peoria, and James H. Sloneker, Minier, Ill., assignors to the United States of America as represented by the Secretary of Agriculture
Original application Dec. 30, 1959, Ser. No. 863,054, now Patent No. 3,000,790, dated Sept. 19, 1961. Divided and this application Oct. 31, 1960, Ser. No. 71,114
6 Claims. (Cl. 252—316)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This application is a division of application bearing Serial No. 863,054, filed December 30, 1959, now Patent No. 3,000,790.

This invention relates to the novel substantially deacetylated derivative of the native microbial polysaccharide gum polymer produced by an aerobic fermentation of the bacterium, *Xanthomonas campestris* NRRL B-1459. This invention further relates to film-forming solutions of the said derivative and to a method of increasing the viscosity of solutions by adding an inorganic salt.

The above polymer possesses unusual and superior physical properties of specific value for a diversity of industrial uses such as film-formation, as thickeners or bodying agents for edible compositions, cosmetic formulations, pharmaceutical vehicles, and drilling muds, and also as emulsifying, stabilizing, and sizing agents. We have also found that solutions of the above deacetylated polysaccharide complex with and precipitate gluten and albumins and globulins from solution, thus providing an effective commercial means of reducing the B.O.D. of proteinaceous waste disposals from pulp mills, slaughter houses, milk plants, flour mills, and related industrial activities. Conversely, it is also apparent that proteinaceous materials could be employed to salvage unprecipitated residuals from a commercial production of our deacetylated polysaccharide and also thereby facilitate a continuous process rather than a batch process.

Native polysaccharide B-1459 as formed in the fermentation desecribed below is the acetyl-ester form of a polymer comprising mannose, glucose and glucuronic acid (as the potassium salt) in the approximate ratio of 2:1:1. The acetyl group comprises 4.7 percent of the native polymer and is present as the ester of a sugar alcoholic hydroxyl group, that is, as the O-acetyl. It can be removed almost quantitatively by treating the recovered native polysaccharide with dilute alkali or, preferably, by adding the alkali as part of the precipitation procedure, inasmuch as the alkali also promotes purification. The precipitation of the native form requires the presence of both inorganic salt and a nonsolvent (viz., 2 percent potassium chloride and 56 percent methanol) whereas the deacetylated form precipitates from a 42–44 percent solution of methanol without salt. Thus, large scale production advantages for the recovery of the deacetylated form are apparent.

A known disadvantageous characteristic of solutions of polyelectrolytes such as gum tragacanth, alignates, and carboxymethyl cellulose is the marked decrease in viscosity in the presence of inorganic salts. Solutions of our deacetylated polysaccharide B-1459 are striking exceptions to the above behavior since the addition of inorganic salt to a 0.25 percent or stronger solution of the deacetylated polysaccharide greatly increases the viscosity. Although we discovered that aqueous solutions of the nature polysaccharide B-1459 show only a modest increase in viscosity in the presence of inorganic salt, solutions of our novel derivative show remarkably increased viscosities upon the addition of inorganic salts such as potassium chloride, borax, and calcium acetate.

Our alkali deacetylation of polysaccharide B-1459 resulted from our finding that the native polymer atypically contains 4.7 percent of acetyl groups and from our thought that the unusual viscosity response of the native polysaccharide to salt might be due to the presence of the acetyl groups. To verify this point we substantially deacetylated the native polysaccharide (analysis of residual acetyl, 0.3 percent) and found that the viscosity of an aqueous solution in the presence of a salt is even greater than of corresponding solutions of the native polysaccharide. In other words, the viscosity of a solution (0.25 percent or greater) of our deacetylated polymer is increased by salt to a much greater degree than is the viscosity of a corresponding solution of the native polymer. Table I shows the viscosities of 1.0 percent aqueous solutions of the native and the deacetylated polysaccharides in the absence of representative salts and in the presence thereof. It will be noted that whereas the viscosity of a 1.0 percent solution of the native polysaccharide B-1459 does not increase further upon increasing the potassium chloride or borax concentrations from the level of 0.25 percent to 5 percent, the viscosity of the deacetylated polysaccharide further increases with calcium acetate when the salt concentration is raised from 0.25 percent to 0.75 percent.

TABLE I

*Viscosities (cps.)*

|  | Native B-1459 (1.0% soln.), salt added, percent | | | | Deacetylated B-1459 (10% soln.), wt./wt. polysaccharide soln.) | | |
|---|---|---|---|---|---|---|---|
|  | 0 | 0.25 | 0.75 | 5.0 | 0 | 0.25 | 0.75 |
| KCl: | | | | | | | |
| Viscosity at 25° C | 2,500 | 4,600 | -------- | 4,600 | 2,560 | 5,850 | 6,400 |
| Increase in viscosity, percent | -------- | 84 | -------- | 84 | -------- | 128 | 150 |
| Borax (Na₄B₂O₇·10H₂O): | | | | | | | |
| Viscosity at 25° C | 2,500 | 4,600 | -------- | 4,600 | 2,560 | 5,050 | 5,650 |
| Increase in viscosity, percent | -------- | 84 | -------- | 84 | -------- | 97 | 120 |
| Ca(OAc)₂·H₂O: | | | | | | | |
| Viscosity at 25° C | 2,500 | 4,950 | 6,900 | -------- | 3,000 | 6,450 | 9,200 |
| Increase in viscosity, percent | -------- | 98 | 176 | -------- | -------- | 115 | 206 |

We have also discovered that glycerol-plasticized films of our deacetylated polysaccharides B-1459 have remarkably superior double-fold resistance as compared with similar films of both the native polysaccharide B-1459 and of corn amylose and sodium carboxymethyl cellulose, films of the latter being well known in the art and considered excellent. Comparative tensile strengths, percent elongations, and double-fold values found with and without glycerol plasticizer for the native polysaccharide B-1459, the deacetylated polymer, corn amylose, and sodium CMC are presented in Tables II and III. Films were prepared by casting a 1 percent solution of the respective polymer, neutralized to pH 6.6–7.0, and containing 0 percent or 30 percent glycerol, on glass plates to a thickness of ⅛ inch and allowing to dry for 4 days under normal atmospheric conditions. Then the films were removed from the plate and humidified under the conditions employed in the tests. Tensile strength was measured at 25° C. and 45 percent relative humidity and fold tests at 22° C. and 50 percent relative humidity.

TABLE II [1]

| | Glycerol, percent | Tensile strength, kg./mm.[2] | Elongation, percent | Double folds |
|---|---|---|---|---|
| Native B-1459 | 0 | 5.8 | 3 | 6 |
|  | 30 | 3.6 | 6 | 1,500 |
| Deacetylated | 0 | 7.6 | 4 | 72 |
|  | 30 | 6.7 | 5.9 | 7,000 |

[1] Averages of 5 or more values.

TABLE III

| | Glycerol, percent | Tensile strength, kg./mm.[2] | Elongation, percent | Double folds |
|---|---|---|---|---|
| Native B-1459 [1] | 0 | 6.5 | 4 | 12 |
|  | 30 | 4.6 | 7 | 3,677 |
| Deacetylated [1] | 0 | 9.4 | 5 | 93 |
|  | 30 | 8.8 | 10 | 27,184 |
| Corn amylose | 0 | 7.2 | 13 | 900 |
|  | 10 | 2.0 | 46 | ([2]) |
| NaCMC [3] | 0 | 7.0 | 10 | 150 |

[1] Highest individual test strip value.
[2] Too much stretch for testing.
[3] Cited from R. L. Whistler (ed.), "Industrial Gums," Academic Press, page 666 (1959).

EXAMPLE 1

*Preparation of Native Polysaccharide B-1459*

Seven and one-half gallons (5 percent by volume) of a whole culture of the bacterium *Xanthomonas campestris* strain NRRL B-1459 is added to 150 gallons of a sterilized (4 minutes at 275° F.) culture medium cooled to 82° F. of the following composition, adjusted to pH 7.0.

| | Percent |
|---|---|
| Dextrose | 3 |
| Dried distiller's solubles | 0.5 |
| K₂HPO₄ | 0.5 |
| MgSO₄·7H₂O | 0.01 |

The above is cultured at 82° F. with continuous agitation and aeration (absorption rate approx. 1 millimole $O_2$/l./min.), determined by the method of Cooper et al. (Ind. Eng. Chem. 36, 504 (1944)) for 96 hours at which time the glucose content has fallen to about 0.4 percent, the pH has decreased to about 6.0, and the viscosity has increased to about 15,000 cps. The crude native polysaccharide B-1459 is then isolated as follows. The fermented medium is diluted with 150 gallons of water, the pH is adjusted to 5.6 with 0.25 N HCl and 124 gals. of methanol is added to make its concentration 24.7 percent by weight. After removal of the cells by centrifugation 50 lbs. of KCl is added to give a concentration of 2 percent based on the water and then 330 gals. of methanol is added with agitation to give a total methanol concentration of 56 percent by weight. A gelatinous flocculent, precipitate of low density is separated by centrifugation and purified by redissolving it in 300 gals. of water, adding 50 lbs. of KCl and 480 gals. methanol, recentrifuging, and washing in methanol. The precipitate is dried in a rotary vacuum drier and yielded 19.5 lbs. of a light tan, dense, dry product analyzing 4.7 percent acetyl groups.

EXAMPLE 2

*Preparation of Deacetylated Polysaccharides B-1459*

Fifteen gms. (0.67 percent) of crude native B-1459 obtained as above is dissolved in 2250 ml. of air-free water in a covered container from which air is displaced by introducing nitrogen. Thirty gms. (1.35 percent) of potassium chloride are added with vigorous stirring and 750 ml. of 0.20 N KOH solution are added resulting in a solution containing 0.5 percent polysaccharide, 1.0 percent KCl, and 0.05 N KOH. The solution is held at 25° C. for 2 hours with continuous introduction of nitrogen gas to exclude oxygen. The solution is then neutralized with 0.25 N HCl and the deacetylated polysaccharide is precipitated as dense, compact particles by adding methanol to provide a concentration of 44 percent by weight, with vigorous agitation. After centrifugation the separated precipitate is redissolved in water to a concentration of 1 percent, the pH adjusted to 7.0, and re-precipitated by adding methanol to provide a concentration of 42–44 percent. The again recovered precipitate is washed and dehydrated in changes of methanol and dried in a vacuum drier to a light tan, dry, dense product analyzing 0.3 percent of acetyl groups.

Having fully disclosed our invention, we claim:

1. A method of substantially increasing the viscosity of a 0.25 to 1.0 percent aqueous solution of the alkali-deacetylated derivative of the native polysaccharide B-1459 comprising adding about from 0.25 to 5.0 percent of a member selected from the group consisting of borax, calcium acetate, and potassium chloride thereto, said native polysaccharide B-1459 having been precipitated by the addition of methanol and potassium chloride to provide respective concentrations of 56 percent and 2 percent thereof in a centrifuged 72 to 96 hour aerobic whole culture fermentation of *Xanthomonas campestris* NRRL B-1459 and then isolated, the alkali-deacetylated derivative of said polysaccharide B-1459 having been obtained by dissolving, under nitrogen, 0.67 part of the isolated native polysaccharide B-1459 in 100 parts of air-free water containing 1.35 parts of potassium chloride, vigorously stirring in 34 parts of 0.20 N potassium hydroxide solution, maintaining the mixture at 25° C. for 2 hours under nitrogen, adjusting the pH to neutrality, precipitating the deacetylated polysaccharide by adding methanol to provide a concentration thereof of 44 percent by weight, and isolating the deacetylated polysaccharide.

2. A method of substantially increasing the viscosity of a 0.25–1.0 percent aqueous solution of the alkali-deacetylated derivative of the native polysaccharide B-1459 comprising adding about from 0.25 to 5.0 percent of a member selected from the group consisting of borax, calcium acetate, and potassium chloride thereto, said native polysaccharide B-1459 having been produced by the whole culture fermentation of *Xanthomonas campestris* NRRL B-1459 under aerobic conditions for about from 72 to 96 hours and then isolated, and being the acetyl-ester form of a polymer comprising mannose, glucose, and glucuronic acid (as the potassium salt) in the approximate ratio of 2:1:1 and in which the acetyl group comprises 4.7 percent of the native polymer and is present as the ester of a sugar alcohol hydroxyl group, the alkali-deacetylated derivative of said polysaccharide B-1459 having been obtained by forming a mixture containing water, potassium chloride, potassium hydroxide, and the isolated polysaccharide in the absence of oxygen whereby the polysaccharide is substantially deacetylated, adjusting the pH of the resulting mixture to neutrality, mixing methanol with the neutralized mixture to precipitate the deacetylated polysaccharide, and isolating the deacetylated polysaccharide.

3. A method of substantially increasing the viscosity of a 0.25 to 1.0 percent aqueous solution of the alkali-deacetylated derivative of the native polysaccharide B-1459 comprising adding about from 0.25 to 5.0 percent of a member selected from the group consisting of borax, calcium acetate, and potassium chloride thereto, said native polysaccharide B-1459 being the acetyl-ester form of a polymer comprising mannose, glucose, and glucuronic acid (as the potassium salt) in the approximate ratio of 2:1:1 and in which the acetyl group comprises 4.7 percent of the native polymer and is present as the ester of a sugar alcohol hydroxyl group, the alkali-deacetylated derivative of said native polysaccharide B-1459 having been obtained by forming a mixture containing water, potassium chloride, potassium hydroxide, and said native polysaccharide B-1459 whereby the polysaccharide is substantially deacetylated, adjusting the pH of the resulting mixture to neutrality, mixing methanol with the neutralized mixture to precipitate the deacetylated polysaccharide, and isolating the deacetylated polysaccharide.

4. The method of claim 3 wherein the member is borax.

5. The method of claim 3 wherein the member is calcium acetate.

6. The method of claim 3 wherein the member is potassium chloride.

References Cited in the file of this patent

UNITED STATES PATENTS 2,961,378     Benedict et al. ---------- Nov. 22, 1960

OTHER REFERENCES

Haug: Guar Mannogalactan Studies, Article in Tappi, vol. 26, No. 1, January 1953, pages 53 and 54.

U.S. Dept. of Agriculture, Agricultural Research Service, Northern Utilization Research and Development Division, Peoria, Illinois, Bulletin CA–N–9, September 1959 (3 pages).

UNITED STATES PATENT OFFICE
CERTIFICATE OF CORRECTION

Patent No. 3,096,293                          July 2, 1963

Allene R. Jeanes et al.

It is hereby certified that error appears in the above numbered patent requiring correction and that the said Letters Patent should read as corrected below.

Column 2, TABLE I, the heading of the second and third major columns should appear as shown below instead of as in the patent:

| Native B-1459 (1.0% soln.) | Deacetylated B-1459 (10% soln.) |
|---|---|
| Salt added, percent (wt./wt. polysaccharide soln.) || same column 2, second line from the bottom of the page, for "polysaccharides" read -- polysaccharide --; column 3, TABLE III, second column, line 6 thereof, for "10" read -- 30 --.

Signed and sealed this 5th day of May 1964.

(SEAL)
Attest:

ERNEST W. SWIDER                      EDWARD J. BRENNER

Attesting Officer                    Commissioner of Patents